United States Patent [19]

Athalye

[11] Patent Number: 4,983,952
[45] Date of Patent: Jan. 8, 1991

[54] BRAKE ACTUATED FLASHING LIGHT SYSTEM FOR A MOTOR VEHICLE

[75] Inventor: Ravindra G. Athalye, Thousand Oaks, Calif.

[73] Assignee: Improved Performance Systems, Inc., Irvine, Calif.

[21] Appl. No.: 462,752

[22] Filed: Jan. 10, 1990

[51] Int. Cl.⁵ .............................................. B60Q 1/50
[52] U.S. Cl. ...................................... 340/467; 340/479
[58] Field of Search ............... 340/467, 471, 479, 464, 340/463, 468; 307/10.8

[56] References Cited

U.S. PATENT DOCUMENTS

| | | | |
|---|---|---|---|
| 2,547,199 | 4/1951 | Dezzani | 340/467 |
| 2,890,443 | 6/1959 | Folberth | 340/467 |
| 2,982,944 | 5/1961 | Weiler | 340/467 |
| 3,332,060 | 7/1967 | Liljequist | 340/467 |
| 3,538,496 | 11/1970 | Bumpous | 340/467 |
| 3,760,353 | 9/1973 | Hassinger | 340/467 |
| 3,846,748 | 11/1974 | Hopwood | 340/467 |
| 4,667,177 | 5/1987 | Athalye | 340/479 |

Primary Examiner—Joseph A. Orsino
Assistant Examiner—Brent A. Swarthout
Attorney, Agent, or Firm—Jack C. Munro

[57] ABSTRACT

A light signal system for a motor vehicle which utilizes the emergency flashing light system which is incorporated within a motor vehicle which is then to be visually observed by other motorists located rearward of the motor vehicle. Normal braking action will not cause actuation of the light signal system. Upon the braking force exceeding a predetermined level, the conventional brake light system of the motor vehicle will be changed into a flashing mode to make it more apparent to following motorists that a potentially dangerous situation is occurring. Actuation of the light signal system is to be made independent of vehicle inclination from horizontal either due to road gradient or suspension non-uniformly.

3 Claims, 2 Drawing Sheets

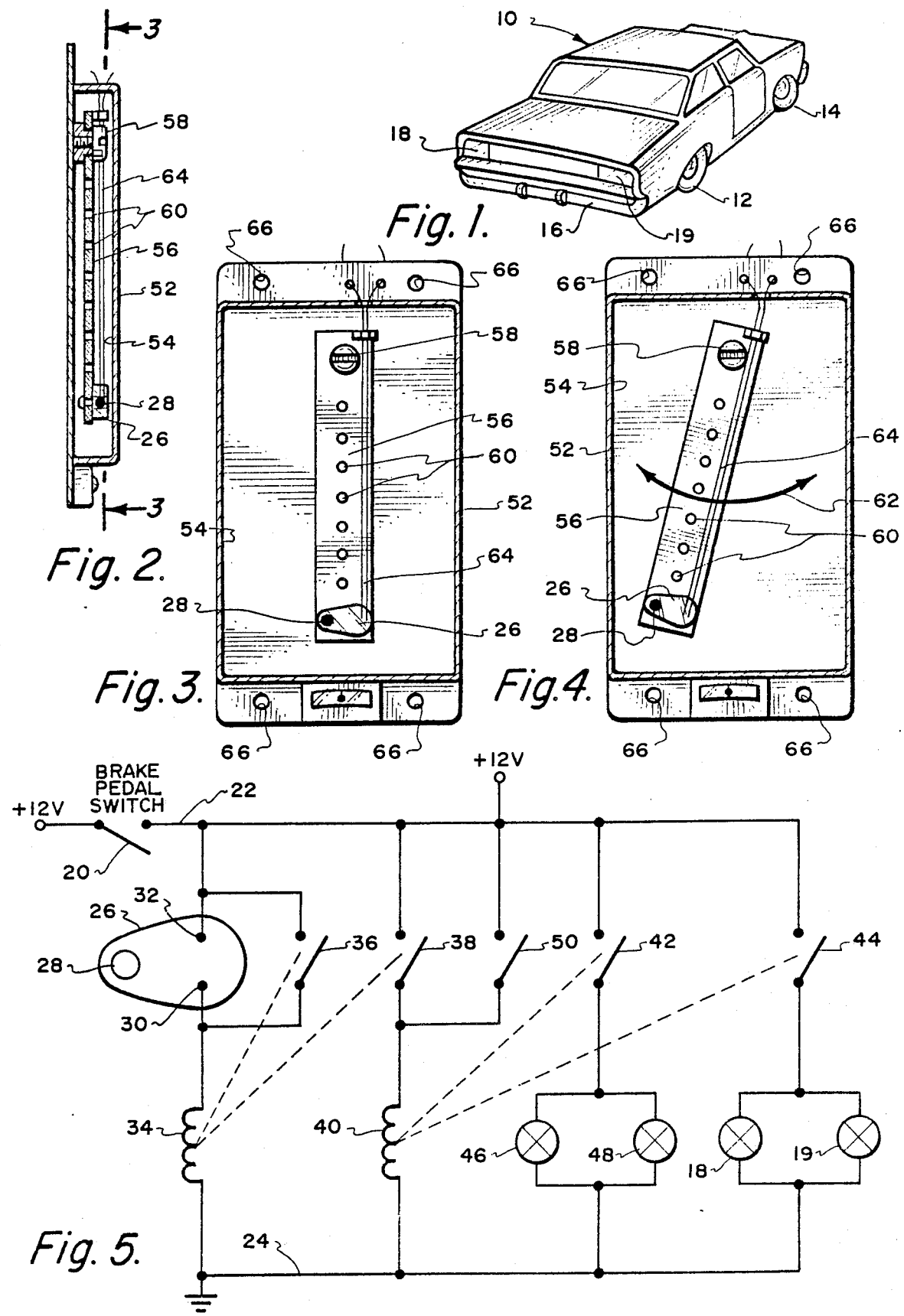

BRAKE ACTUATED FLASHING LIGHT SYSTEM FOR A MOTOR VEHICLE

BACKGROUND OF THE INVENTION

The subject matter of this invention relates to a vehicle signaling system, and more particularly to a lighting system for advising motorists following a motor vehicle that a vehicle is being decelerated at a rapid rate to give those motorists indication of a potentially dangerous situation occurring.

The subject matter of this invention is deemed to be an improvement of U.S. Pat. No. 4,667,177 issued May 19, 1987, entitled BRAKE LIGHT SIGNAL SYSTEM FOR A MOTOR VEHICLE by the present inventor. Also, the subject matter of this invention is essentially identical to previously submitted U.S. patent application Ser. No. 07/158,646, filed Feb. 22, 1988, now abandoned.

During the course of operating a motor vehicle, a motorist must be constantly aware of the manner in which most other motorists are operating their vehicle. In the case of a motorist following a motor vehicle, the following motorist must be careful to maintain a safe stopping distance between his vehicle and the vehicle which he is following. It has therefore been the general practice to equip all motor vehicles with brake lights that are visible to the following motorists and are automatically energized whenever the vehicle on which such are mounted is being braked.

It is common to utilize a pair of spaced apart red lights mounted at the rear of the motor vehicle which is activated upon the vehicle being braked. The intensity of the brake lights is constant. Also, the brake lights are activated during the entire time the braking of the motor vehicle is occurring. A following driver is unable to ascertain whether the vehicle is merely slowing down or is making a fast emergency stop.

In the past, various systems have been constructed to indicate to following motorists that a vehicle is being decelerated at an unusually rapid rate. Such a system is shown or taught within the aforementioned U.S. Pat. No. 4,667,177. The structure of the aforementioned Patent provides for the inclusion of an additional series of lights which are to be progressively actuated as the severity of the braking of the motor vehicle occurs. However, an additional expense is required to supply the additional series of lights.

Incorporated within all cars and trucks is an emergency flashing light system. This emergency flashing light system is to be activated by an on/off switch by the operator of the motor vehicle when the motor vehicle is potentially dangerous such as being stopped alongside of a roadway. This emergency flashing light system causes the brake lights mounted in the rear of the motor vehicle and the parking lights mounted in the front of the motor vehicle to flash continuously "on" and "off". Other motor vehicle operators have grown accustomed when seeing "flashing" lights to recognize that a potentially dangerous situation is apparent.

SUMMARY OF THE INVENTION

The primary objective of the present invention is to construct a light signal system for a motor vehicle which is only activated upon rapid deceleration of the motor vehicle which activates the emergency flashing light system incorporated within that motor vehicle to indicate to other motorists that a dangerous situation is occurring.

Another objective of the present invention is to construct a motor vehicle light signal system which utilizes the conventionally available light arrangement mounted within the motor vehicle Without the requiring of adding any additional lights, therefore, minimizing the expense of such a light signal system.

It is another objective of this invention to have the motor vehicle light signal system not respond to the gradient on which the car moves or the attitude of the vehicle due to difference of suspension between the front and rear of the car.

The light signal system of the present invention utilizes a single inertially sensitive switch which is connected electrically in series with a first coil. The inertially sensitive switch is designed to close upon a predetermined level of deceleration of the motor vehicle being achieved. This closing of this inertial sensitive switch activates the first coil which in turn closes a flasher coil switch. This closing of the flasher coil switch activates a flasher coil which then in turn closes a switching assembly which causes the emergency flashing light system to be activated. Upon the braking force being released, the entire signal system is reset to its at-rest position ready to become operated again at a time when rapid deceleration of the vehicle occurs.

BRIEF DESCRIPTION OF THE DRAWING

FIG. 1 is an elevational view of the rear portion of a motor vehicle within which has been installed the light signal system of the present invention;

FIG. 2 is a cross-sectional view of the typical housing arrangement for the light signal system of the present invention as it would be installed within a motor vehicle;

FIG. 3 is a cross-sectional view taken along line 3—3 of FIG. 2 showing the light signal system housing in the inactive position;

FIG. 4 is a view similar to FIG. 3 showing the light signal system housing in a different inactive position which would occur when the motor vehicle is going uphill;

FIG. 5 is a wiring diagram showing the electrical circuitry utilized to operate the light signal system of the present invention;

DETAILED DESCRIPTION OF THE SHOWN EMBODIMENT

Figure 6:
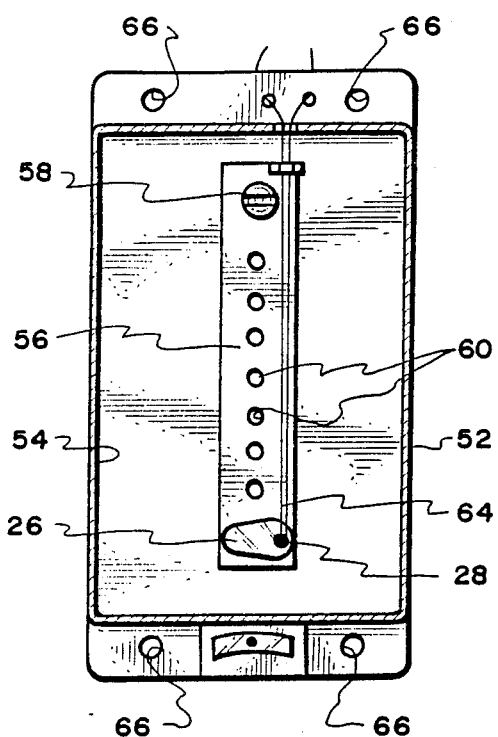
FIG. 6 is a view similar to FIG. 3 showing the light switch system housing in an activated position.

Referring particularly to the drawing, there is shown in FIG. 1, a typical motor vehicle 10 which has a right rear wheel 12, a right front wheel 14 and a rear bumper 16. Associated alongside the rear bumper 16 is a conventional taillight system including a pair of lights 18 and 19. The lights 18 and 19 sure to be activated by depressing the brake pedal (not shown) within the motor vehicle 10.

Depressing of the brake pedal within the motor vehicle 10 closes brake pedal switch 20. This causes the conducting of a positive twelve volts to conductor 22 with respect to ground line 24. Closing of the brake switch 20 immediately activates the lights 18 and 19 by a circuitry not shown. This is the normal operation of lights 18 and 19.

If the motor vehicle 10 begins to rapidly decelerate, the mercury switch 26 will at sometime close. Closing occurs when the bubble 28 of mercury contained within the enclosed glass container of the mercury switch 26 is caused to make electrical connection between contacts 30 and 32 also contained within the glass container. Establishment of this electrical connection causes the coil 34 to be activated. Immediately upon activation of coil 34, by-pass switch 36 is closed as is also flasher light switch 38. Now if perchance the bubble 28 disconnects from contacts 30 and 32, the by-pass switch 36 will still remain closed and will only open upon the brake pedal switch 20 being moved to an open position. Such an arrangement will prevent momentary flashing light occurrences and once the emergency light signal system of this invention is activated, it will remain activated until the motor vehicle 10 is to a complete stop and the brake pedal is released causing opening of the switch 20.

Closing of the flasher switch 38 activates flasher coil 40. Flasher coil 40 in turn closes light switches 42 and 44. Closing of light switch 42 activates parking lights 46 and 48 mounted within the front of the motor vehicle 10. By switch 44 closing, the taillights 18 and 19 are activated within the rear portion of the motor vehicle 10. The flasher coil 40 is to be of the type that will cause rapid turning "on" and "off" of the lights 18, 19, 46 and 48. It is to be understood that upon release of the brake pedal switch 20, the switches 36, 38, 42 and 44 will all move to the open position.

If it is desired by the operator of the motor vehicle that the flasher coil be activated other than by through the use of the brake pedal switch 20, there is provided a manually operated switch 50 which when moved to the closed position will cause coil 40 to be activated in the same manner as coil 40 was activated by switch 38.

The circuitry shown within FIG. 3 is to be mounted on some form of structure such as a housing 52. Housing 52 has an enclosed chamber 54. A strip member 56 is supported as a pendulum by bolt 58 within chamber 54. Mercury switch 26 is fixedly mounted on the lower end of strip member 56. S&rip member 56 is free to pivot (swing) about bolt 58. When mounting the switch 26 on strip member 56, the angle of inclination can be varied. The greater the angle of inclination of the switch 26, the greater the amount of deceleration force that will be required to affect operation of the switch 26. It is to be considered to be within the scope of this invention that this angle of inclination could be adjustable.

Further, the switch 26 could be mounted by any one of the holes 60. The closer switch 26 is to bolt 58 the slower the reaction time in activating switch 26. When the vehicle 10 is slowly decelerated, the strip member 56 will pivot as represented by arrow 62 in both FIGS. 4 and 7. Slow deceleration occurs during normal braking of the motor vehicle. Switch 26 does not electrically close electrical conductor 64 since slow movement of strip member 56 does not cause bubble 28 to connect with the open ends of conductor 64. Conductor 64 is mounted on strip member 56 and exits chamber 54 directly adjacent bolt 58. Conductor 64 then connects with the circuitry shown in FIG. 5.

Figure 7:
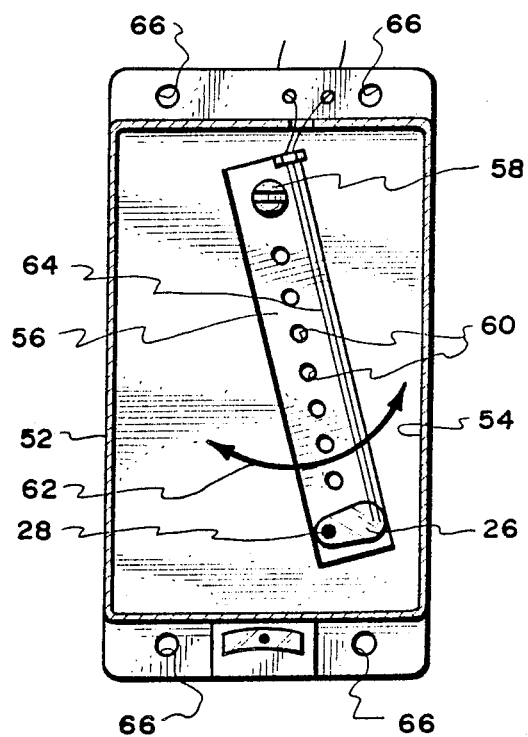
FIG. 7 is a view similar to FIG. 4 but in the position of the light signal system housing when the motor vehicle is going downhill.

Slow movement also occurs when the motor vehicle goes uphill and downhill. Strip member 56 pivots as shown in FIGS. 4 and 7 during uphill and downhill movement. Such uphill and downhill movement does not cause bubble 28 to close conductor 64. For a sports car that makes quick adjustments to hills, the bubble 28 should be mounted on strip member 56 as shown in the drawings. For a large sedan that is sluggish in adjusting to hills, the bubble 28 might be mounted closer to bolt 58. This is known as the first time for response.

When the motor vehicle 10 brakes rapidly, the inertia causes the bubble 28 to close conductoor 64. Bubble 28 is able to move in contact with conductor 64 before the strip member 56 is able to pivot. This is known as the second time for response. In other words, there are two different times for response—switch 26 reacting by quick movement and strip member 56 reacting by slow movement.

The greater the inclining of the bubble 28 on the strip member 56, the greater amount of deceleration force that is required to close switch 26. This provides for adjustment as to how much quick deceleration will result in closing of switch 26. Therefore, adjustment of both the first and second time for response is provided.

A common place for mounting of the housing 52 would be within the trunk of the motor vehicle 10. Holes 66 can be for this purpose when used with a conventional bolt or screw fastener (not shown).

What is claimed is:

1. In combination with a motor vehicle, said motor vehicle having a braking system, a light signal system connected to said motor vehicle, said light signal system being actuated by said braking system, said light signal system including an emergency flashing light system, said light signal system comprising:

means for activating said emergency flashing light system, said means including an inertially sensitive switch, said inertially sensitive switch being movable between a normally open position and a closed position, said inertially sensitive switch being supported by support means, a slow deceleration of said motor vehicle causes said inertially sensitive switch to be held in said open position, quick deceleration of said motor vehicle causes said inertially sensitive switch to move to said closed position causing activation of said emergency flashing light system; and said support means comprising an elongated strip member, said elongated strip member being mounted on a pivot axis to a housing, said housing to be fixedly attached to said motor vehicle, said inertially sensitive switch including a mercury bubble switching device, said mercury bubble switching device being mounted on said strip member distally located from said pivot axis, said mercury bubble switching device being mountable on said strip member at various positions so as to distally vary the location of said mercury bubble switching device from said pivot axis, whereby the closer said mercury bubble switching is to said pivot axis the slower the reaction time in activating said mercury bubble switching device.

2. In combination with a motor vehicle, said motor vehicle having a braking system, a light signal system connected to said motor vehicle, said light signal system being actuated by said braking system, said light signal system including an emergency flashing light system, said light signal system comprising:

means for activating said emergency flashing light system, said means including an inertially sensitive switch, said inertially sensitive switch being movable between a normally open position and a closed position, said inertially sensitive switch to be held in said open position, quick deceleration of said motor vehicle causes said inertially sensitive switch to move to said closed position causing activation of said emergency flashing light system;

said support means comprising an elongated strip member, said elongated strip member being mounted on a pivot axis to a housing, said housing to be fixedly attached to said motor vehicle, said inertially sensitive switch including a mercury bubble switching device, said mercury bubble switching device being mounted on said strip member distally located from said pivot axis; and said strip member including a plurality of spaced apart mounting holes, said mercury bubble switching device to be mountable within any one of said mounting holes, each said mounting hole to be located at a different distance from said pivot axis, whereby relocating of said mercury bubble switching device within another one of said mounting holes alters the time it takes for said mercury bubble switching device to move from said normally open position to said closed position.

3. The combination as defined in claim 2 wherein:

said mercury bubble switching device being located at an inclined position on said strip member, said mercury bubble switching device being mountable at various said inclined positions, varying of said inclined position changes the amount of deceleration force that is required to affect operation of said mercury bubble switching device.

* * * * *